(12) United States Patent
Cheng

(10) Patent No.: US 8,842,078 B2
(45) Date of Patent: Sep. 23, 2014

(54) TOUCH DISPLAY DEVICE

(75) Inventor: Chieh-Yuan Cheng, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 614 days.

(21) Appl. No.: 12/905,062

(22) Filed: Oct. 14, 2010

(65) Prior Publication Data

US 2011/0084935 A1 Apr. 14, 2011

(30) Foreign Application Priority Data

Oct. 14, 2009 (CN) .......................... 2009 1 0206849

(51) Int. Cl.
*G06F 3/041* (2006.01)

(52) U.S. Cl.
CPC ...... *G06F 3/041* (2013.01); *G06F 2203/04103* (2013.01)
USPC ....................................................... 345/173

(58) Field of Classification Search
USPC ....................................................... 345/173
See application file for complete search history.

(56) References Cited

U.S. PATENT DOCUMENTS

| 2004/0164966 | A1* | 8/2004 | Lee ............................... 345/173 |
| 2007/0140068 | A1* | 6/2007 | Teffenhart et al. ............ 368/327 |
| 2009/0185276 | A1* | 7/2009 | Matsuhira ..................... 359/601 |

OTHER PUBLICATIONS

Stephen Chen, "PVI announces touch-control e-Paper solution, continues to pull ahead of competition with differentiated products", http://www.virtualpressoffice.com/detail.do?contentId=1211402271404&showId=1181060943262, http://www.pvi.com.tw/en/news/news_view.php? lists=8, May 19, 2008.

* cited by examiner

*Primary Examiner* — Jonathan Boyd

(57) ABSTRACT

A touch display device includes a display panel including a first surface and a second surface. The first surface is a displaying surface of the display panel, and the second surface is the other surface of the display panel opposite to the displaying surface. The touch display device further includes a circuit board disposed on a side of the second surface of the display panel, and a touch panel disposed between the display panel and the circuit board.

6 Claims, 3 Drawing Sheets

TOUCH DISPLAY DEVICE

BACKGROUND OF THE INVENTION

1. Field of the Invention

The present invention relates to a touch display device, and more particularly, to a touch display device with a touch panel disposed between a display panel and a circuit board.

2. Description of the Prior Art

With the advanced electronic technology, a modern display device trends a portable and convenient structure, economy design of power, and a touchable operation. The touch display device is widespread applied on a television, a notebook computer, a liquid crystal display, a mobile phone, a personal digital assistant, an electronic book, and so on. The touch display device includes a touch panel disposed on a display panel, so that a user can touch the touch panel to generate an electronic signal for executing a predetermined program. Therefore, it is convenient that the user does not have to utilize an inputting device, such as a keyboard, a mouse, a remote controller, and so on, to control the touch display device.

Please refer to FIG. 1. FIG. 1 is a diagram of a conventional touch display device 1 in the prior art. The touch display device 1 includes a touch panel 11, a display panel 12, a circuit board 13, a first connecting cable 14, and a second connecting cable 15. The touch panel 11 is adhered to a displaying surface of the display panel 12, and the circuit board 13 is disposed on the other surface of the display panel 12. The first connecting cable 14 is electrically connected between the touch panel 11 and the circuit board 13, and the second connecting cable 15 is electrically connected between the display panel 12 and the circuit board 13. The touch panel 11 is disposed on the displaying surface of the display panel 12, so transparency of the display panel 12 is affected by the touch panel 11. Thus, the touch panel 11 must be a transparent structure, and the adhesive disposed between the touch panel 11 and the display panel 12 must be made of transparent material. Due to expensive cost of the transparent adhesive and the touch panel 11, such as indium tin oxide (ITO) material, design of a touch display device having low manufacturing cost is an important issue of the touch display industry.

SUMMARY OF THE INVENTION

The present invention provides a touch display device having high transparency and low manufacturing cost for solving above drawbacks.

According to the claimed invention, a touch display device includes a display panel comprising a first surface and a second surface. The first surface is a displaying surface of the display panel, and the second surface is the other surface of the display panel opposite to the displaying surface. The touch display device further includes a circuit board disposed on a side of the second surface of the display panel, a touch panel disposed between the display panel and the circuit board, a first connecting cable electrically connected between the display panel and the circuit board, and a second connecting cable electrically connected between the touch panel and the circuit board.

According to the claimed invention, the touch display device further includes an adhesive layer disposed between the display panel and the touch panel for adhering the display panel on the touch panel.

According to the claimed invention, the adhesive layer is an opaque curing adhesive or an opaque silica gel.

According to the claimed invention, the touch panel is an inductive touch panel, a capacitive touch panel, or a resistive touch panel.

According to the claimed invention, the touch panel comprises a first substrate and a second substrate, and the first substrate and the second substrate are made of plastic material, metal material, or glass material.

According to the claimed invention, the circuit board is a multi-layer circuit board, and the touch panel is integrated on the multi-layer circuit board.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
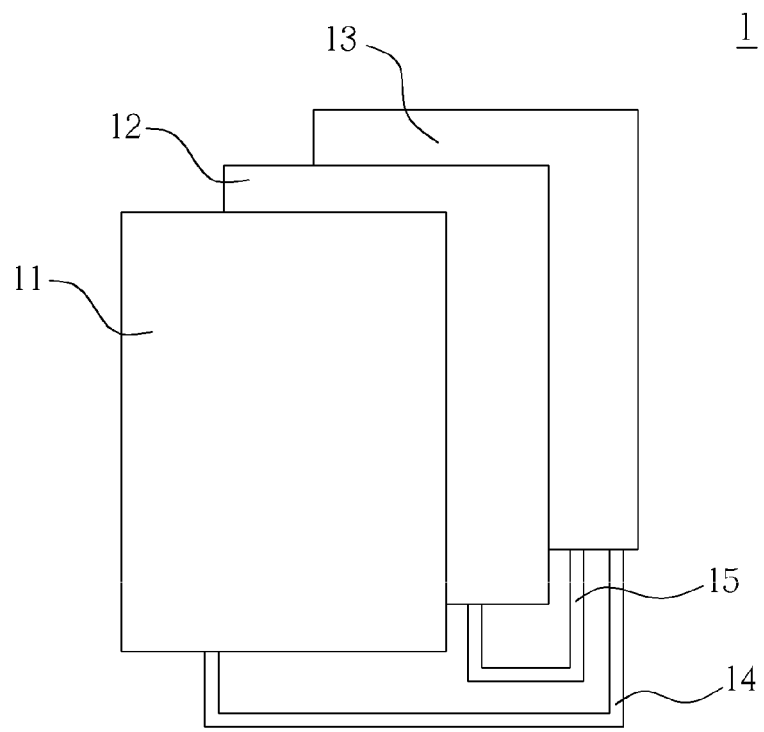
FIG. 1 is a diagram of a conventional touch display device in the prior art.
Figure 2:
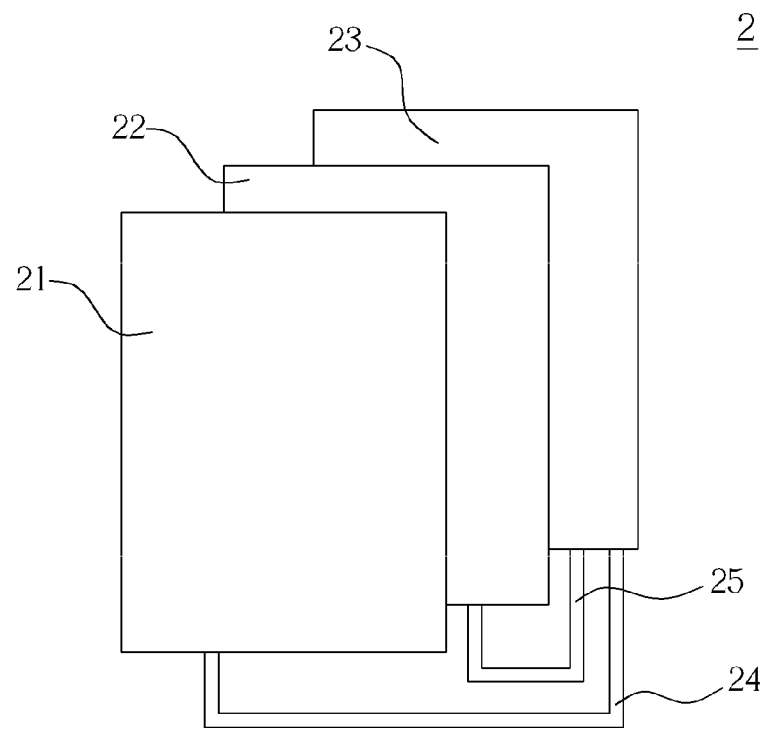
FIG. 2 is an exploded diagram of a touch display device according to a first embodiment of the present invention.
Figure 3:
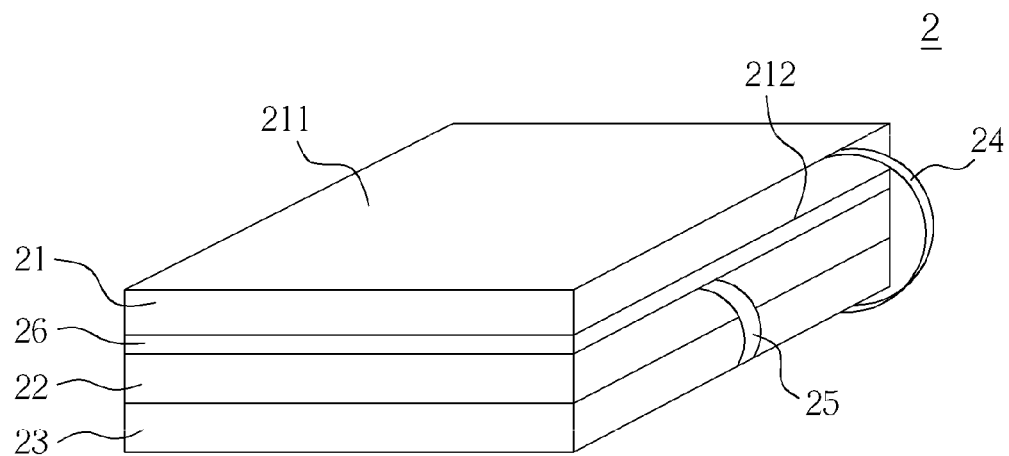
FIG. 3 is an assembly diagram of the touch display device according to the first embodiment of the present invention.

Please refer to FIG. 2 and FIG. 3. FIG. 2 is an exploded diagram of a touch display device 2 according to a first embodiment of the present invention. FIG. 3 is an assembly diagram of the touch display device 2 according to the first embodiment of the present invention. The touch display device 2 includes a display panel 21, a touch panel 22, a circuit board 23, a first connecting cable 24 electrically connected between the display panel 21 and the circuit board 23, and a second connecting cable 25 electrically connected between the touch panel 22 and the circuit board 23. The display panel 21 includes a first surface 211 and a second surface 212 opposite to the first surface 211. The first surface 211 is a displaying surface of the display panel 21. The circuit board 23 is disposed on the second surface 212 of the display panel 21. The touch panel 22 is disposed between the display panel 21 and the circuit board 23.

As shown in FIG. 3, the touch panel 22 of the touch display device 2 of the present invention is disposed on a side of the display panel 21 opposite to the displaying surface, so transparency of the display panel 21 is not affected by the touch panel 22, and the touch display device 2 has a preferable illumination.

As shown in FIG. 3, the touch display device 2 further includes an adhesive layer 26 disposed between the display panel 21 and the touch panel 22 for adhering the display panel 21 to the touch panel 22. As the transparency of the display panel 21 is not affected by the touch panel 22 disposed between the display panel 21 and the circuit board 23, the adhesive layer 26 disposed between the display panel 21 and the touch panel 22 can be made of ordinary material and need not be limited to transparent material so as to reduce the manufacturing cost. For example, the adhesive layer 26 of this embodiment can be an opaque curing adhesive or an opaque silica gel, preferably.

Figure 4:
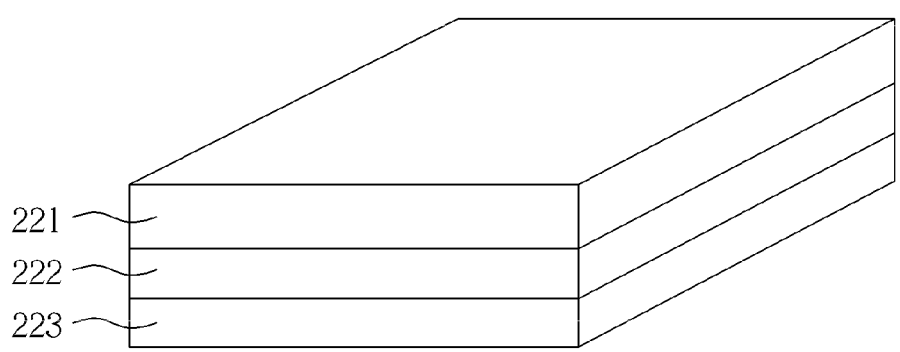
FIG. 4 is a diagram of a touch panel according the first embodiment of the present invention.

Please refer to FIG. 3 and FIG. 4. FIG. 4 is a diagram of the touch panel 22 according the first embodiment of the present invention. The touch panel 22 can be an inductive touch panel, a capacitive touch panel, a resistive touch panel, and so on. As shown in FIG. 4, the touch panel 22 includes a first substrate 221, an isolating gasket 222, and a second substrate 223. Because the touch panel 22 of the present invention is disposed on the second surface 212 of the display panel 21 opposite to the displaying surface (the first surface 211), the first substrate 221 and the second substrate 223 of the touch panel 22 need not be made of expensive transparent material, such as indium tin oxide (ITO) material. In this embodiment, the first substrate 221 and the second substrate 223 can be made of plastic material, metal material, or glass material for reducing the manufacturing cost of the touch display device 2.

Figure 5:
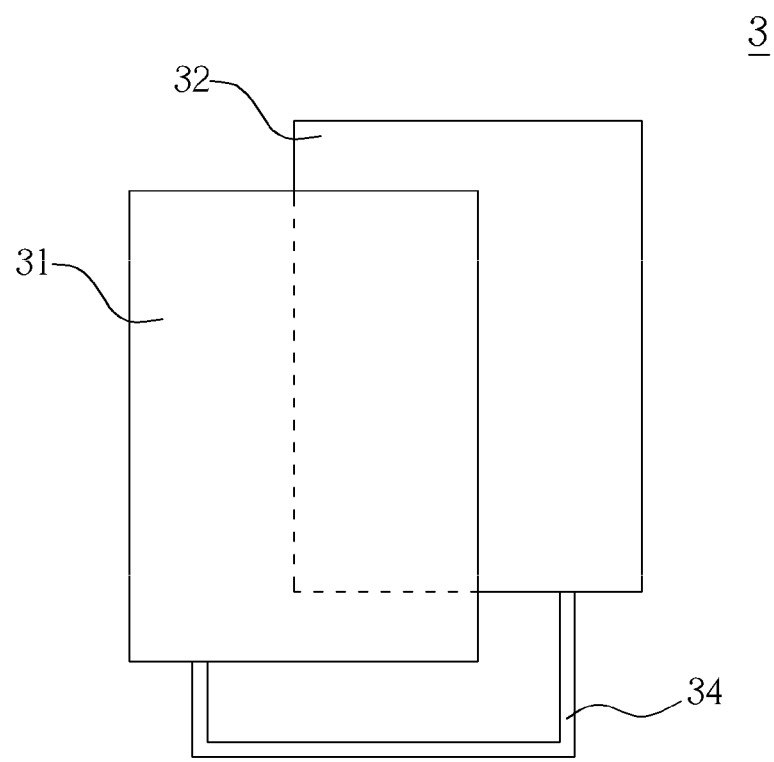
FIG. 5 is an exploded diagram of a touch display device according to a second embodiment of the present invention.
Figure 6:
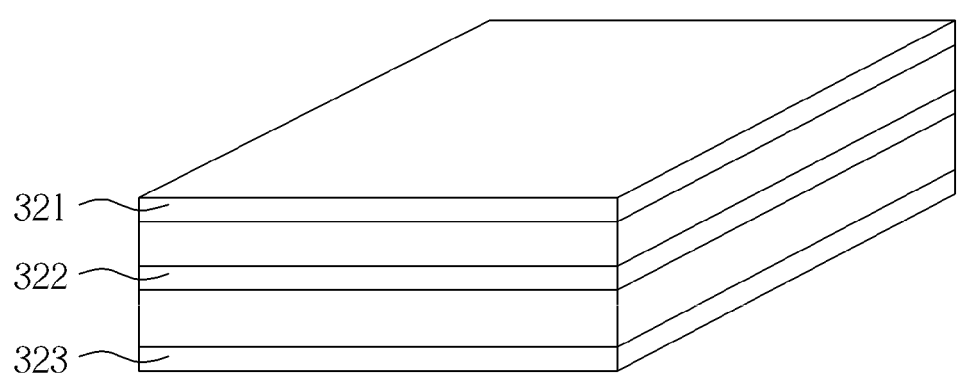
FIG. 6 is a diagram of a circuit board shown in FIG. 5 according to the second embodiment of the present invention.

Please refer to FIG. 5. FIG. 5 is an exploded diagram of a touch display device 3 according to a second embodiment of the present invention. The touch display device 3 includes a display panel 31, a circuit board 32 whereon a touch panel is integrated, and a connecting cable 34 electrically connected between the display panel 31 and the circuit board 32. The circuit board 32 is disposed on a surface opposite to a displaying surface of the display panel 31. Please refer to FIG. 6. FIG. 6 is a diagram of the circuit board 32 shown in FIG. 5 according to the second embodiment of the present invention. The circuit board 32 is a multi-layer circuit board. In this embodiment, there are three layers in the circuit board 32, including a first substrate 321, a second substrate 322, and a third substrate 323. The first substrate 321, the second substrate 322, and the third substrate 323 can be ordinary printed circuit boards. For example, the first substrate 321 and the second substrate 322 of the touch display device 3 of the second embodiment can be similar to the first substrate 221 and the second substrate 223 of the touch panel 22 shown in FIG. 4 according to the first embodiment of the present invention, the touch panel is integrated on the circuit board 32 in the second embodiment, and electronic components and an integrated circuit layout can be disposed on the third substrate 323. In the second embodiment, a connecting cable disposed between the touch panel and the printed circuit board can be omitted due to the integration of the touch panel and the circuit board 32, so the speed of the signal transmission between the touch panel and the circuit board 32 is improved effectively.

In contrast to the prior art, the touch display device of the present invention disposes the touch panel on the side of the display panel opposite to the displaying surface, so that the transparency of the display panel is not affected by the touch panel. It can effectively improve the illumination of the touch display device and reduce the manufacturing cost.

Those skilled in the art will readily observe that numerous modifications and alterations of the device and method may be made while retaining the teachings of the invention.

What is claimed is:

1. A touch display device comprising:
    a display panel comprising a first surface and a second surface, the first surface being a displaying surface of the display panel, and the second surface being the other surface of the display panel opposite to the displaying surface;
    a circuit board disposed on a side of the second surface of the display panel, the circuit board being electrically coupled to the display panel; and
    a touch panel disposed between the display panel and the circuit board, the touch panel being electrically coupled to the circuit board;
    wherein the circuit board is a multi-layer circuit board which includes a first, a second and a third substrates, and the touch panel is so integrated on the multi-layer circuit board that the touch panel and the circuit board are directly connected with no impeding device there between.

2. The touch display device of claim 1, further comprising:
    an adhesive layer disposed between the display panel and the touch panel for adhering the display panel on the touch panel.

3. The touch display device of claim 2, wherein the adhesive layer is an opaque curing adhesive or an opaque silica gel.

4. The touch display device of claim 1, wherein the touch panel is an inductive touch panel, a capacitive touch panel, or a resistive touch panel.

5. The touch display device of claim 1, wherein the touch panel comprises a first substrate and a second substrate, and the first substrate and the second substrate are made of plastic material, metal material, or glass material.

6. The touch display device of claim 1, wherein the circuit board is electrically coupled to the display panel by a first connecting cable.

* * * * *